United States Patent
Chatroux et al.

(10) Patent No.: US 10,050,245 B2
(45) Date of Patent: Aug. 14, 2018

(54) ELECTROCHEMICAL BATTERY MODULE HAVING IMPROVED RESISTANCE IN MOIST ENVIRONMENTS AND METHOD FOR PRODUCING AT LEAST ONE SUCH MODULE

(71) Applicant: COMMESSARIAT A L'ENERGIE ATOMIQUE ET AUX ENERGIES ALTERNATIVES, Paris (FR)

(72) Inventors: Daniel Chatroux, Teche (FR); Sebastien Carcouet, Vif (FR); Jean-Noel Carminati, Gresy-sur-Aix (FR); Frederic Gaillard, Voiron (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 117 days.

(21) Appl. No.: 15/108,208

(22) PCT Filed: Dec. 24, 2014

(86) PCT No.: PCT/EP2014/079298
§ 371 (c)(1),
(2) Date: Jun. 24, 2016

(87) PCT Pub. No.: WO2015/097280
PCT Pub. Date: Jul. 2, 2015

(65) Prior Publication Data
US 2016/0322616 A1    Nov. 3, 2016

(30) Foreign Application Priority Data
Dec. 26, 2013    (FR) ..................... 13 63613

(51) Int. Cl.
*H01M 10/052*    (2010.01)
*H01M 2/10*    (2006.01)
*H01M 2/12*    (2006.01)

(52) U.S. Cl.
CPC ....... *H01M 2/1094* (2013.01); *H01M 2/1077* (2013.01); *H01M 2/1223* (2013.01); *H01M 2200/20* (2013.01); *H01M 2220/20* (2013.01)

(58) Field of Classification Search
CPC ..................... H01M 10/052; H01M 10/0525
See application file for complete search history.

(56) References Cited

U.S. PATENT DOCUMENTS

| 5,254,415 A | 10/1993 | Williams et al. |
| 2010/0119926 A1 | 5/2010 | Gaben et al. |

(Continued)

FOREIGN PATENT DOCUMENTS

| DE | 27 44 503 B1 | 3/1979 |
| DE | 36 17 866 A1 | 5/1990 |

(Continued)

OTHER PUBLICATIONS

International Search Report dated May 13, 2015 in PCT/EP2014/079298 (with English language translation.

(Continued)

*Primary Examiner* — Olatunji Godo
(74) *Attorney, Agent, or Firm* — Oblon, McClelland, Maier & Neustadt, L.L.P.

(57) ABSTRACT

A module for an electrochemical battery including plural accumulators electrically connected together by connection elements, a mechanism for electrical connection of the module with an exterior and a continuous envelope made from a dielectric polymer material that covers exterior surfaces of the accumulators, and connection elements that do not cover the mechanism for electrical connection of the (Continued)

module with the exterior. The continuous envelope is made by soaking to ensure coating of the accumulators and of the one or more connecting elements. The plural accumulators are distributed into plural layers, arranged in relation to each other so that one or more passages are made between the accumulators, wherein the continuous envelope covers a surface of the accumulator or accumulators delimitating the passages between the accumulators.

25 Claims, 4 Drawing Sheets

(56) References Cited

U.S. PATENT DOCUMENTS

| | | |
|---|---|---|
| 2012/0064379 A1 | 3/2012 | Oguri et al. |
| 2012/0148889 A1 | 6/2012 | Fuhr et al. |
| 2015/0129538 A1 | 5/2015 | Grange et al. |
| 2015/0329986 A1 | 11/2015 | Ollier et al. |

FOREIGN PATENT DOCUMENTS

| | | |
|---|---|---|
| EP | 0 902 494 A1 | 3/1999 |
| EP | 2 506 360 A1 | 10/2012 |
| EP | 2 626 922 A1 | 8/2013 |
| JP | 7-37563 A | 2/1995 |
| JP | 2003-243047 A | 8/2003 |
| JP | 2005-285455 A | 10/2005 |
| JP | 2009-266740 A | 11/2009 |
| JP | 2010-40332 A | 2/2010 |

OTHER PUBLICATIONS

Preliminary Search Report dated Jul. 14, 2014 in French Patent Application No. 1363613 (with English translation of categories of cited documents).

Written Opinion dated May 13, 2015 in PCT/EP2014/079298 (with English language translation).

ELECTROCHEMICAL BATTERY MODULE HAVING IMPROVED RESISTANCE IN MOIST ENVIRONMENTS AND METHOD FOR PRODUCING AT LEAST ONE SUCH MODULE

TECHNICAL FIELD AND PRIOR ART

The present invention relates to a module for an electrochemical battery with improved resistance in moist environments, the batteries made with these modules being used in particular in the field of electric and hybrid transportation and in on-board systems.

Lithium-type batteries are well suited for use in the field of transportation and for on-board applications, due to their ability to store large amounts of energy despite their low mass.

The terminal voltage levels for these batteries are ever increasing, for example 300V-400V for automobiles and 600V-800V for electric buses or lorries, so it is becoming necessary to design high-performance systems for protecting both property and individuals.

The use of a high capacity (several tens of Ah) and high voltage (400V DC) battery means that precautions must be taken to protect property and individuals.

For reasons associated with electrical safety during manufacture, transportation and maintenance, the batteries are preferably split into modules with lower unit voltages, for example of less than 48V DC.

These modules are comprised of a plurality of electrically linked accumulators. These accumulators must be protected from atmospheric conditions such as dust, rain, snow, hail, sea air and variations in atmospheric conditions, for example from water condensation. Indeed, the presence of water can initiate an electric arc. In addition, humidity and salt spray can have a seriously adverse effect on the working life of batteries, since they amplify corrosion effects.

In order to protect accumulators, and electronics boards used to control the accumulators, from external conditions, the accumulators have conventionally been fitted in a sealed case. Ensuring that the case is leak-tight poses problems. Furthermore, in operation the accumulators release heat, and confinement in a sealed space does not favour removal of the heat. This has a significant impact on the working life of the accumulators, which typically begins to decrease as soon as the temperature exceeds 35° C. and which decreases rapidly above 45° C.

Several solutions have been proposed for removing this heat.

One of the solutions is to ensure a flow of external air around the case. This solution is applicable in the case where there is a small temperature increase.

In the event of the temperature rise being more significant, cooling of the interior of the case is carried out by circulating a heat transfer fluid between the accumulators in a given module. This fluid is conventionally water, which is chosen because of its excellent thermal transfer qualities. This solution requires very high quality seals in order to prevent water leaks which may result in leakage currents, a risk of short circuits and which could cause fires. This solution increases the mass of the assembly and its cost, and in addition it is relatively complex to implement, in particular because of the requirement for seals, which must withstand installation in a vehicle, where the seals age and are exposed to vibrations.

Another solution involves making air flow between the accumulators. Cooling which makes use of air flows taken directly from the external environment is not, or only rarely, used, however, because of atmospheric conditions which can cause condensation, from rain water, snow and ice, to appear on and between the accumulators. One solution for overcoming the atmospheric conditions is to use dry air which has been treated to remove dust and possibly conditioned at the desired temperature before coming into contact with the accumulators. This air is taken, for example, from the passenger compartment, and its flow is restricted so as not to adversely affect passenger comfort.

DESCRIPTION OF THE INVENTION

An aim of the present invention is consequently to provide a module of battery accumulators which offers both good protection against atmospheric conditions and good thermal exchange with the external environment, which is simple to manufacture and of low mass.

A supplementary aim of this invention is also to offer a battery comprising accumulators in which there is improved electrical insulation between one accumulator and another.

The above stated aim is achieved by a battery module which comprises a plurality of accumulators electrically connected to each other and means of controlling the accumulators, the assembly being coated with one or more continuous layers of lacquer, where this lacquer is electrically insulating, and where only the connections to the exterior are not covered.

The continuous layer of lacquer provides protection for the various components of a battery module against atmospheric conditions, so they are protected against corrosion by pollution and by moisture. The achievement of water-tightness is therefore simplified and the mass of the module is substantially reduced in comparison with a module confined in a sealed case.

The protection by means of a layer of lacquer furthermore offers the advantage of allowing air to pass directly alongside the accumulators. In the case of stacked accumulators, passages exist between the accumulators; the lacquer allows these passages to be kept free so that a fluid, for example external air, can pass through these passages, ensuring that heat is removed. These passages form a large heat exchange surface area. Thus, in comparison with a module confined in a sealed case, the cooling air circulates directly between the accumulators, ensuring very good heat removal. In addition, since the layer of lacquer is very thin, of the order of 10 μm to 100 μm for example, it does not act as thermal insulation. In addition, air taken directly from the exterior may be used for cooling without pre-drying it.

In other words, a monolithic block of accumulators is made which is protected from the external environment by a coating of lacquer, with said block offering a large heat exchange surface area.

As a result of the invention there is very good heat exchange between the accumulators and the external air due to the absence of intermediate exchange circuits, and due to the use of the entire contact surface of all the walls of all accumulators for heat transfer. This is a very significant advantage in comparison with the cooling systems of the existing art, for example those based on water, in which the transfer of heat into the fluid is very efficient, but is limited by a heat transfer contact surface area between each of the accumulators and the heat exchangers with the water which is too small as a result of integration constraints.

Furthermore, the mechanical strength of the accumulator stack is advantageously improved by the layer or layers of lacquer.

The module is made by soaking an assembly of accumulators, connected together beforehand, where the connections to the exterior and any safety devices in the event of excess pressure are protected during the soaking step.

In a particularly advantageous manner, the creation of a vacuum is performed during the soaking step to ensure that a good coating is obtained.

Advantageously, the accumulators grouped together into one or more modules may each be arranged on an electrically insulating support whose shape prevents a continuous liquid film appearing. Such a film could form a conductive path between two modules or a module and another conductive element, for example when modules are in the presence of moist air or are subject to condensation from the latter. In order to do this the support comprises on its lower surface opposite the upper surface supporting the accumulator or accumulators, a zone or zones which protrude or recede and which are designed to break up the film of water that is liable to form and to cause the water to flow in drop-wise form.

Advantageously, means of monitoring the electrical insulation between the module located on the insulating support and a metallic conductive element at least vertically in line with the protruding or receding zone or zones.

Thus by causing a stream of water to flow under gravity, the appearance of a conductive path is prevented between the accumulators on this support and other accumulators or between the accumulators on this support and another conductive element such as the bodywork of a vehicle. Furthermore, by verifying the electrical insulation between the module and the electrically conductive element, the operating safety of the battery can be controlled.

This additional characteristic overcomes risks due to the presence of insulation defects in accumulators.

In one advantageous example, the accumulators are grouped together into several modules, with the modules being connected to each other; each module is arranged on an insulating support according to the invention, so the modules are insulated from each other.

In an even more advantageous manner, the module supports are supported by a common insulating support which is itself, for example, supported by the roof of a vehicle. This common insulating support also allows any stream of water to flow under gravity, reducing the risk of conduction between one or more modules and the bodywork.

The subject-matter of the invention is therefore a module for an electrochemical battery which comprises at least two accumulators electrically connected to each other by means of connection elements, means of electrical connection of the module with the exterior and a continuous envelope made of a dielectric polymer material which covers the external surface of the accumulators and the at least one connection element, and which does not cover the means for connecting the module with the exterior, said envelope being made by soaking so as to ensure that the accumulators and said at least one connection element are covered. Advantageously the module comprises several accumulators distributed over several layers, arranged in relation to one another such that one or more passages are made between the accumulators, with the envelope covering the surface of the accumulator or accumulators delimitating the passages between the accumulators.

Very advantageously thickness of the envelope is between 10 μm and 300 μm.

In one embodiment example, the envelope is formed of several layers made successively, where the layers are made from the same polymer material or from different polymer materials.

For example the polymer material or materials are chosen from acrylic, silicone or phenolic lacquers.

In an embodiment example the accumulators are cylindrical in shape with a circular cross section, with the accumulators being arranged in staggered rows manner.

The module may advantageously comprise means which form spacers placed between the accumulators.

According to an additional characteristic, at least one accumulator comprises a safety device against excess pressure, of the pressure relief valve type. The safety device against excess pressure may be covered by a cap, designed to be ejected in the event of excess pressure. This cap may additionally comprise an excess-pressure vent. The cap may be covered by the envelope polymer. In a variant a filler material is provided in the excess pressure safety device which prevents the polymer material from adversely affecting the operation of the excess pressure safety device.

According to an additional characteristic, at least one part of the surface of the passage or passages may exhibit a surface condition that is designed to cause turbulent flow.

In one embodiment example, at least one of the accumulators has an envelope made of porous material, such as card, suitable for being impregnated with the polymer material.

The module may comprise electronics for measurement, balancing and control to which it is connected by an electrical connection, where the electronics for measurement, balancing and control and said electrical connection are covered by the envelope of polymer material.

Another subject-matter of this invention is a battery comprising at least two modules according to this invention.

The battery may comprise means of generating a movement of air between the accumulators.

According to an advantageous characteristic the battery may comprise at least one module comprising one or more accumulators connected together, at least one electrically insulating support on which is arranged at least a part of the accumulators, said electrically insulating support comprising an upper face on which at least a part of the accumulators rests and a lower face, and at least one protruding or receding zone of the lower face formed in or on said lower surface, said zone edging all or part of the external contour of the lower face and a support element upon which said electrically insulating support rests, such that said zone is arranged at a distance from a surface on which the support element rests in order to cause a potential stream of liquid to flow under gravity.

Advantageously, the surface comprises at least one conductive metallic element located at least vertically in line with the protruding or receding zone and means of verifying the electrical insulation between said metallic conductive element and the module or any conductive part connected to a terminal of said module.

The means of verifying the electrical insulation between said conductive metallic element and the module or any conductive part connected to a terminal of said module are, for example, means of monitoring the variation in the impedance between said conductive metallic conductive element and the module or any conductive part connected to a terminal of said module.

In a preferred example, the accumulators are distributed as at least two modules, where the accumulators of each module are electrically connected to each other and where the modules are electrically connected to each other, where each module is carried by an electrically insulating support, said electrically insulating support comprising an upper face on which at least a part of the accumulators rests and a lower face, and at least one protruding or receding zone of the lower face formed in or on said lower surface, said zone edging all or part of the external contour of the lower face and a support element upon which said electrically insulating support rests, such that said zone is arranged at a distance from a surface on which the support element rests in order to cause a potential stream of liquid to flow under gravity.

Advantageously, the surface comprises a conductive metallic element located at least vertically in line with each protruding or receding zone and means of verifying the electrical insulation between each metallic conductive element and the associated module or any conductive part connected to a terminal of said module.

In one embodiment example, the electrically conductive elements are electrically connected to each other. The support elements are made of an electrically conductive material and are in electrical contact with each other and form electrically conductive elements.

In an advantageous example, the battery may comprise a common support made of material which is electrically insulating to the module supports, where the common support is designed to rest on an electrically conductive surface, which comprises an upper face on which the module rests and a lower face, and at least one zone which protrudes or recedes from the lower surface formed in or on said lower surface, said zone following all or part of the external contour of the lower face such that said zone protruding or receding from the common support is arranged at a distance from all surfaces in order to cause a stream of liquid to flow under gravity.

Advantageously, the battery comprises means for monitoring the electrical insulation between the conductive metallic elements and the electrically conductive surface on which the common support is intended to rest. The means for monitoring the electrical insulation are, for example, means for monitoring the variation in impedance between the electrically conductive surface and the conductive metallic elements.

The zone may be formed by a protruding element. The support or supports may be part of a single piece.

According to another characteristic, the protruding element is attached to the lower face.

The zone may be grooved. In a variant, the protruding element is made of a single piece or by the assembly of several pieces.

The supports and/or the protruding element are, for example, made of epoxy resin or of a glass or epoxy composite.

The upper face of the insulating support or supports may be convex or comprise at least two faces inclined towards the exterior to facilitate the removal of water.

At least the upper face of the insulating support or supports may advantageously exhibit hydrophobic properties.

Another purpose of this invention is an automotive vehicle comprising at least one battery according to this invention.

The battery rests advantageously on the automotive vehicle's bodywork. In one embodiment example using at least one insulating support, the bodywork is not connected to a reference voltage.

Another subject-matter of the present invention is a method for the manufacture of an electrolytic battery module comprising at least two electrolytic accumulators, and which comprised the following steps:

a) distribution of the accumulators into several layers so that one or more passages are made between the accumulators, b) electrical connection of the accumulators to each other through connecting elements and the creation of means for connecting the module to the exterior, c) protection of the means of connection to the exterior, d) the creation of a continuous envelope by soaking the accumulators in a bath of dielectric polymer material, where the continuous envelope covers the surface of the accumulator or accumulators marking out the boundary of the passages between the accumulators.

e) drying of the polymer material.

Preferably a vacuum is created during step d).

The accumulators may be connected together before step d), for example by bonding.

In the event of step d) being carried out several times, the polymer material may be the same as the polymer material in the previous step d) or not.

In the event of at least one accumulator comprising a safety device against excess pressure, it is advantageously envisaged that prior to step d) the safety device be protected in order to prevent the protection device being clogged by the dielectric polymer material.

For example protection is carried out using a cap.

BRIEF DESCRIPTION OF THE ILLUSTRATIONS

The present invention will be better understood using the description which follows and the appended illustrations, in which.

DETAILED DESCRIPTION OF PARTICULAR EMBODIMENTS

Figure 1:
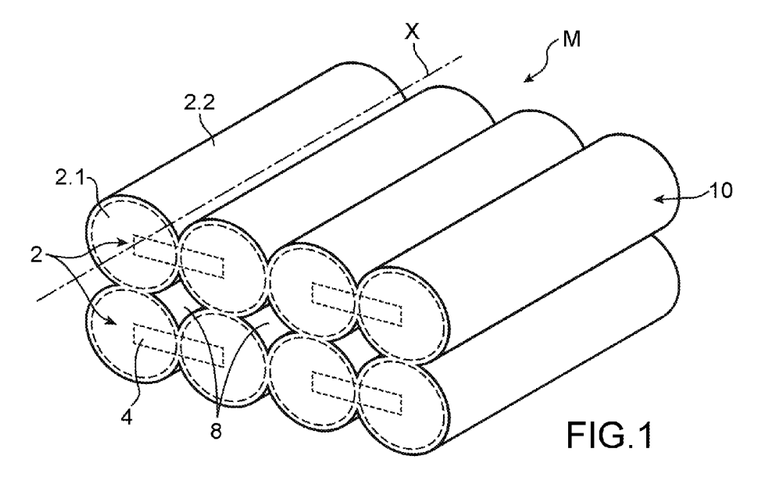
FIG. 1 is a perspective diagrammatic view of a module of accumulators according to the invention.

FIG. 1 shows a diagrammatic view of a module of accumulators for a battery according to one example embodiment of the present invention. A battery pack comprises, amongst other things and in general, several modules connected to each other, control electronics, terminals for connections to the exterior and a support structure for the various elements.

In this example, the module M comprises eight accumulators 2, electrically connected to each other by electrical linking components 4 which link terminals of opposite sign of two accumulators. A module M also comprises an electronic system for control and for balancing of the accumulators, carried by at least one electronics board (not shown) and electrical connections between the accumulators and the electronics board. The module also comprises terminals for connections to the exterior (not shown).

The accumulators 2 exhibit a longitudinal axis X and are generally cylindrical in form, advantageously circular in cross-section or prismatic in shape. They comprise a first face 2.1 at a first longitudinal end, a second face (not visible) at a second longitudinal end, and a lateral surface 2.2.

In the example shown, where the accumulators are all the same length, the stack of accumulators comprises a first face containing the first faces 2.1 of accumulators 2 and a second face (not visible) containing the second faces of the accumulators 2. In a variant, the different accumulators could be of different dimensions.

When the accumulators are stacked, empty spaces 8 are made between the accumulators and extend along the length of the accumulators and emerge at the first and second faces of the stack. These spaces therefore form channels between the accumulators. In the example shown the lateral surfaces 2.2 of the accumulators 2 are in direct contact, but placing spacers 11 between the accumulators could be envisaged (FIG. 3B) in order to separate the accumulators from each other and make channels of greater cross-section, and/or allow air to circulate between the channels. For example the spacers are each bonded to two accumulators. The spacers are preferably shaped in such a way that they make close contact with the lateral wall of the accumulators. The use of spacers is of even greater benefit in the case of accumulators with a polygonal, for example rectangular or square, cross section.

The module M also comprises a continuous envelope 10 formed of one or more layers of lacquer which cover the accumulators 2, the electrical connection components, the electronics board or boards and the electrical connections, and which form a continuous envelope. Only the module's electrical power contacts and the control electronics electrical contacts between the modules are not covered.

When several successive layers cover or coat the elements of the accumulator modules, the layers may all be made of the same materials, or made from different materials. The use of several layers increases the mechanical strength of the module element protection.

This envelope 10 covers the end faces of the accumulators, with the lateral faces of the accumulators forming the external faces of the stack and those demarcating the empty spaces and extending between the lateral faces of the accumulators. The envelope 10 of lacquer therefore forms an interior surface of the channels.

The lacquer forms an individual sealed envelope for the accumulators and a collective one for the module.

The channels 8 are through-channels and allow air to flow between the accumulators which removes the heat produced by the accumulator operation.

The thickness of the lacquer may be, for example, between 10 µm and 100 µm. In the case of several layers the total thickness may reach 200 µm, or even 300 µm.

The lacquer used exhibits dielectric properties; advantageously it exhibits high dielectric strength.

The lacquer is for example a polymer lacquer, advantageously an acrylic lacquer, a silicone lacquer or a phenolic lacquer. These lacquers exhibit a high dielectric strength, greater than 100 kV/mm. Thus with a lacquer thickness of between 10 µm and 100 µm, or even up to 300 µm, an even greater dielectric strength is achieved.

A phenolic lacquer has the advantage of providing good protection against the initiation of fire.

The continuous layer of lacquer seals each component of the module and protects them against corrosion by pollution and moisture in the air. It is therefore possible to cool the module with air coming directly from the exterior, with no drying of the air being required before it is circulated between the accumulators. Cooling of the module is therefore considerably simplified.

Advantageously, the lacquer can be chosen such that in addition it exhibits hydrophobic properties, hence water at the surface takes the form of drops instead of being in the form of streams or of films. This improves the protection of the accumulators even further, for example in the case of a defect in the layer of lacquer or of missing lacquer.

It should be noted that although in general the lacquer exhibits low thermal conductivity in comparison with metals, since the layer of lacquer is very thin it has little or no influence on thermal exchange, and in the case of cooling using air, it is the boundary layer, the film of still air at the surface of the walls of the accumulators that provides the major part of the thermal resistance.

Prior to the creation of the lacquer layer, the accumulators may be joined together by bonding or by another means. Advantageously the lacquer may provide, or at least enhance, this mechanical joint.

Advantageously a forced flow of air or other cooling fluid is provided in order to ensure a sufficient flow of cooling fluid to produce turbulent flow, in order to break up the boundary layers at the surface of the accumulators.

Figure 2:
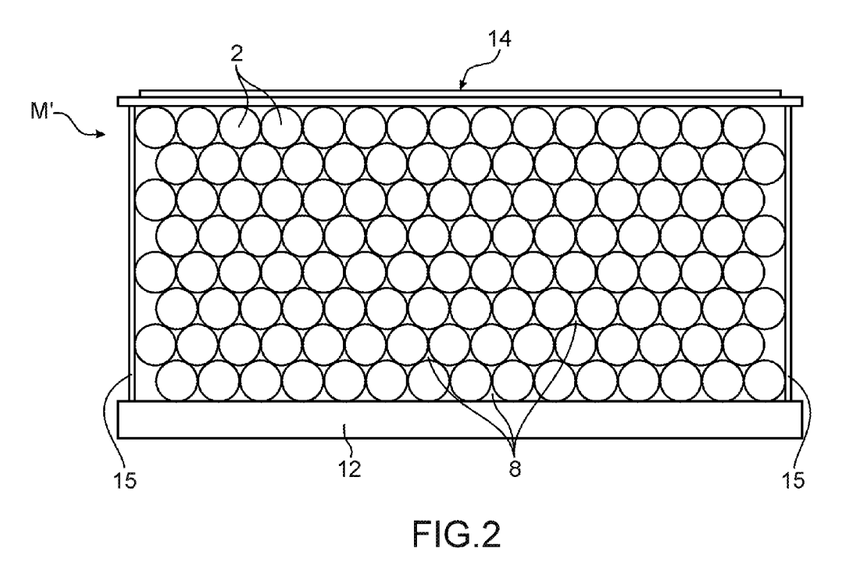
FIG. 2 is a front view of an embodiment example of another example of a module of accumulators according to the invention.

In FIG. 2 an advantageous embodiment example of a module M can be seen wherein the accumulators are stacked in staggered rows. The effect of this arrangement is to reduce the cross-section of the channel passages 8 between the accumulators, but without reducing the heat exchange surface area. In the case of force air circulation obtained using a fan, for a given air flow the air speed is higher in contact with the accumulators, which improves heat exchange. On the other hand this results in a slightly higher pressure drop than in the case of a stack as in FIG. 1 and therefore in a slight increase in the electricity consumption of the fan.

Figure 3A:
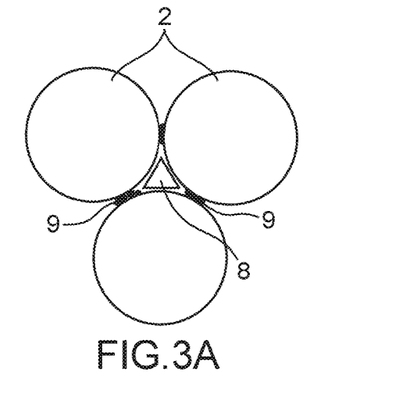
FIG. 3A is a front view of accumulators assembled by being bonded directly to one another.
Figure 3B:
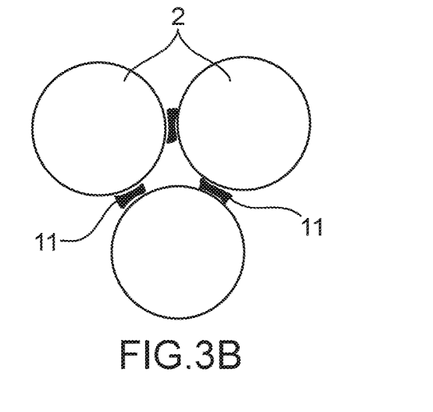
FIG. 3B is a front view of accumulators, with spacers being provided between the accumulators.

This staggered rows stacking of accumulators also offers greater mechanical rigidity of the stack when the accumulators are joined together either by bonding prior to the creation of the layer of lacquer, or by the layer of lacquer itself. In FIG. 3A, the accumulators are bonded together in a staggered alternating arrangement by points of adhesive 9. In a variant, the accumulators are joined together only by the lacquer. Thus a module of accumulators is obtained which exhibits good mechanical strength without substantially increasing the mass of the assembly. Furthermore, stacking in a staggered rows manner results in a high degree of compactness.

The accumulators comprise, for example, a lateral envelope made of dielectric plastic material in order to insulate the accumulators from each other. In an advantageous variant, the envelope is formed from a porous material, for example a porous card, which becomes impregnated with lacquer during the application of the coating. On the one hand this impregnation has the effect of improving the mechanical strength between the accumulators; on the other hand it increases the dielectric strength of the envelope.

The module M' in FIG. 2 comprises a support plate 12 upon which are the accumulators are stacked, in a staggered rows manner in the example shown, an electronics board 14 arranged on the upper surface of the stack opposite the support plate 12, intra-accumulator electrical connections and electrical connections between the accumulators and the electronics board 14 are not shown for the sake of simplicity. A strap 15 surrounds the stack, the electronics board and the support plate. The strap is advantageously used to supplement the bonding between the accumulators and provides additional mechanical restraint with little additional mass. The strap may also be used alone. The module M' also comprises a continuous envelope of lacquer (not shown for the sake of simplicity) as described above in relation to FIG. 1, which covers the accumulators, the support plate, the electronics board, the connections between accumulators and the surfaces of the channels 8. Only the connections to the exterior are not covered with lacquer.

The support plate 12 is used to fix the module to the structure of the battery pack. Lateral support plates may also be added.

As mentioned above, the limiting point for heat exchange is the presence of a boundary layer of still air along the lateral surfaces of the accumulator. It may be advantageously envisaged to ensure rough surfaces on the accumulators, at least at the inlet of the airflow, in order to create turbulence and to break up this layer of still air.

A module wherein the accumulators are arranged in a plane falls within the scope of the present invention.

Generally the accumulators comprise an excess pressure safety device. In the event of an internal fault, overload or excess discharge, gases are generated in the accumulator, the internal pressure increases and the safety device protects against the risk of explosion by allowing the gas to escape to the exterior of the accumulators.

These safety devices are formed, for example, of rupture disks with a pressure threshold, a weak zone in the accumulator housing, or a safety valve.

In the case of rupture disks, the layer of lacquer used does not hinder their operation since the thickness of lacquer of between 10 μm-100 μm, or even up to 300 μm, has only a negligible effect on the rupture pressure. Similarly in the case of scored sections in the accumulator housing. The thickness of the lacquer of 10 μm to 100 μm, or even up to 300 μm, only modifies the rupture pressure very little.

In the case of safety valves, precautions are taken to ensure that the lacquer layer does not prevent the operation of the valve.

Figure 4A:
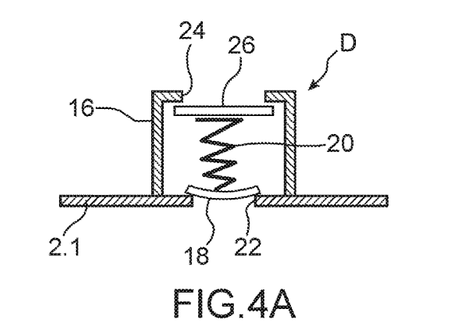
FIG. 4A is a diagrammatic representation of an example of a safety device for the accumulator.

In FIG. 4A an embodiment example of such a safety valve D can be seen in section, mounted on an end face 2.1 of an accumulator, for example.

The safety valve comprises a hollow body 16 fixed to the accumulator housing, a vent body 18 and a spring 20. The housing comprises a passage 22 for the removal of the excess pressure of gas. The vent body 18 making a seal around the outside of the passage 22 forms the vent seat.

The hollow body 16 is open, so as to allow the gas to escape, in the example the opening 24 is at its opposite end to that fixed to the accumulator housing. This opening is partially blocked by a component 26 which forms a support for the spring. The spring is mounted so as to react against the component 26 and the vent body 18 so as to press the vent body 18 against the vent seat in the absence of excess pressure.

The spring 20 is calibrated in accordance with the desired excess pressure threshold.

During coating with lacquer the valve is protected for example using a cap which may subsequently be left in place and which will be ejected during a release of gas. The cap fitting is therefore chosen such that it does not oppose the release of gas.

In a variant, adhesive tape may be placed over the opening 24 of the vent during lacquering and subsequently removed, thus preventing the lacquer from entering the valve. The fitting of a cap onto the valve may subsequently be envisaged in order to protect it from the external environment, where this cap is designed to be ejected during a release of gas.

In a variant, placing an electrically insulating material can be envisaged, such as wax or a grease of suitable viscosity, in the base of the hollow body 16, so as to come between the lacquer and the shutter, preventing the shutter adhering to the vent seat due to the lacquer. The protective material is such that it is not dissolved by the lacquer.

The use of a grease or wax-type material at the base of the vent or of a cap resting on the vent offers the advantage of protecting the metallic parts against inclement weather during normal operation.

Figure 4B:
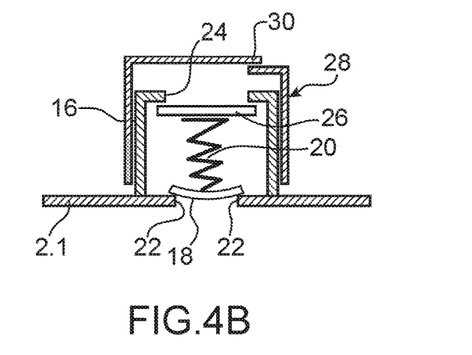
FIG. 4B is a diagrammatic representation of another example of a safety device for the accumulator.

In FIG. 4B, an example of an advantageous embodiment of a safety vent protective cap can be seen fitted to the pressure release vent.

The cap 28 itself comprises a vent 30 which opens at low pressure. The cap is made of electrically insulating material, of plastic for example, and the vent is formed by a cut-out in the base of the cap. As explained above, the reduced thickness of the lacquer does not adversely affect the operation of this vent 30. Thus the safety vent is protected during lacquering.

The use of this plug also offers the advantage of protecting the valve against inclement weather and dust.

Figure 5:
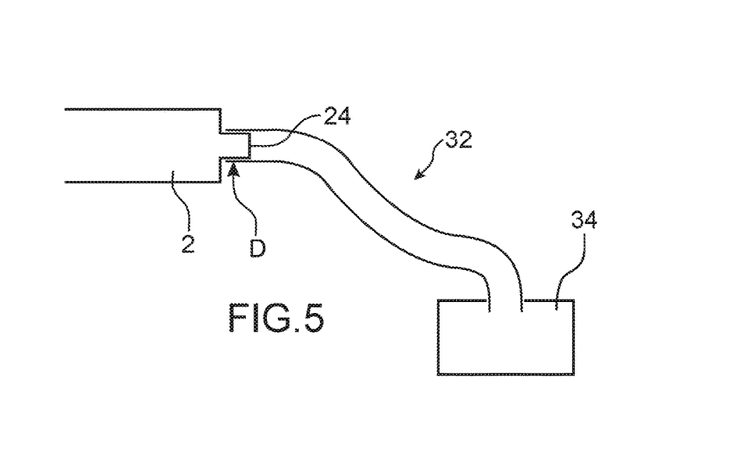
FIG. 5 is a diagrammatic representation of an accumulator equipped with an improved excess pressure safety device.

In FIG. 5 an embodiment variant can be seen wherein a tube 32 connects the opening 24 of the safety vent to a reservoir 34 for recovering the gas escaping from the accumulator and/or the electrolyte. The tube is made of electrically insulating material. The reservoir is advantageously located at a lower height than that of the vent so that the end of the tube connected to the vent does not fill up with water in the event of condensation or inclement weather.

For low power or rapid recharge applications, a battery pack which uses modules covered with one or more layers of lacquer according to the invention and cooled by external air may be used, for example in an application in buses with a rapid recharge at the end of a line. For example a bus travelling a 10 km line in 30 minutes is partially recharged at the end of the line in 4 minutes with a 3C to 5C charge regime. That is, a value of charge current (in Amperes) which is 3 to 5 times greater than the capacity (in Ampere·hours).

Heating is reduced in low power applications. The placing of filters in the air circuit can then be envisaged, filters whose levels of performance are limited, and which only trap large particles or objects. Indeed, because of the electrical protection provided by the lacquer according to the present invention, trapping of fine dust is not necessary. This simplifies the filters and minimises the maintenance costs of the filter. It is possible to use only a simple grille to trap larger particles and to clear away deposits at regular intervals, for example by operating the fans in reverse at full power. Advantageously vehicle cooling fans which can rotate in both directions are therefore envisaged.

In high power applications in which there is more significant heating, with "open circuit" operation of the ventilation circuit the module may be made so as to be tolerant to natural blockage of the air circuit which reduces the coefficient of heat exchange between the accumulators and the cooling air. For example, the accumulators are spaced apart from one another at a distance of at least 10 mm in order that the blockage of the circuit due to dust does not adversely affect the cooling of the system. It should be recalled that there is a boundary layer which is 2 mm to 3 mm thick around each accumulator.

The use of a roughened surface, at least at the entry to the passages between the accumulators described above, to break up this boundary layer can allow the spacing between the accumulators to be reduced.

Preferably fans are used which can rotate in both directions, where rotation at full speed in the reverse direction removes large particles or objects which have become stuck against any filter or on the constituents of the battery pack.

The process for manufacturing the layer or layers of lacquer on the module elements will now be described.

During the first step the accumulators and other elements comprising the module are mechanically fixed together, for example by bonding and/or by means of a strap as is shown in FIG. 2, and/or by other means.

The safety devices are protected in accordance with one of the techniques described above. The communication connection systems between the CAN type electronics for example (Controller Area Network which is a serial communications bus commonly used in transport for example) and power connections to the terminals of the pack modules are also temporarily protected, for example using adhesive tape or suitable caps.

In the next step the assembly thus formed is soaked in a bath of lacquer.

During the next step the assembly thus coated with lacquer is taken out of the bath. It is then dried naturally, or in an oven, or in an air flow, depending on the desired speed of drying.

The protection on the safety device or devices if appropriate and on the connection systems and on the power connections are removed after drying.

The coating and drying steps may be repeated several times, depending on the number of layers it is wished to make.

The thickness of the layer or of the layers is controlled by controlling the lacquer viscosity. In the case of several layers, the thickness of the set of layers may be between 10 μm and 100 μm, or even 200 μm or yet again 300 μm.

Thus a monolithic block is formed, of accumulators which are very effectively and simply protected from the external environment. Furthermore, it does not require the use of an additional box around the accumulators, so the module and therefore the battery can be made less bulky.

In a highly advantageous manner during soaking step b), a vacuum can be created which ensures that the lacquer has covered all the areas of the module and thus that high quality coating has been achieved. This vacuum creation step is particularly beneficial in the case of accumulators which comprise a plastic sleeve as an external envelope, or a card envelope. In the case of a plastic sleeve the creation of a vacuum allows the lacquer to infiltrate between the sleeve and the accumulator housing, which provides very good mechanical strength. In the case of porous card, the lacquer impregnates the card and bonds the latter onto the accumulator over its entire surface.

To create a battery pack comprising several modules, each module is coated with one or more layers of lacquer separately then the modules are assembled onto a pack structure, for example, and connected together. The various modules may be soaked simultaneously in the bath of lacquer or successively.

The creation of one or more layers of lacquer offers effective protection of the components of an accumulator module against moisture and pollution. Due to the invention's resistance to condensation or external pollution, it can be used in severe maritime-type environments.

In addition the modules made in this way exhibit greater durability not only due to the mechanical protection but also due to the electrical protection provided by the lacquer.

The present invention also offers the advantage of providing modules which withstand accidental immersion, for example when a vehicle is subjected to flooding, falling into a water course or passing through an unexpectedly deep flooded zone. The tightness of assemblies of the prior art are suitable for water spraying, but the leak-proofing is not suitable for immersion even to limited depth, since air must be exchanged between the exterior and the interior of the battery packs to allow for differences in air pressure during changes of altitude or due to meteorological variations.

A greater choice of battery pack locations is available as a result of the invention. Indeed, the battery pack may be located in the lower part of the vehicle, since the modules are protected against accidental immersion.

The use of one or more continuous layers of lacquer provides very effective protection of the modules and of the other components of a battery pack against inclement weather. There is nevertheless no way of guaranteeing that there are not defects present in the layer or layers of lacquer, or that none will appear with the passage of time.

A battery pack comprises several accumulator modules. Within a module the accumulators in this module are at different potentials, the differences in potential do not exceed a voltage Vmodule.

Within a pack, between modules or between the accumulators in different modules, the difference in potential does not exceed a voltage Vpack.

During charging, the vehicle is connected to earth, the pack, the modules and the accumulators may be exposed to circuit over-voltages if the charger used is not insulated (Vmc). These network over-voltages may be several kilovolts, in particular in rural areas, and if necessary may be reduced by peak crimping on the electrical installation by using surge suppressors (called lighting arrestors).

Even if the charger is insulated, due to its stray capacitance with the vehicle a voltage Vmc is produced during mains over-voltages.

For the safety of the users, the vehicle bodywork must not be subjected to a voltage greater than the safety voltages.

For continuity of service the earth leakage current must not exceed the current of the installations differential circuit breakers or residual current circuit breakers.

When there is rainwater, snow or condensation water present a film of water may form and current may pass between two defects in the lacquer of a given module. This has a limited impact however. Due to the voltage of a few tens of volts, the surface area of the defects and the current path lengths between two defects, the current level will be of a few milliamperes for example and will only give rise to an imbalance in the module through a slight discharge of certain accumulators. This does not result in any risk to safety and will be compensated for by the modules' balancing circuit.

On the other hand, as explained above an electrical connection through a film of water between modules may result in the release of hydrogen at hazardous levels, may initiate an arc and cause a fire to start. Equally, water passing between a single module and the vehicle creates a defect which could cause the installation to trip, or which could be hazardous for users if the vehicle bodywork is not connected to earth, either as the result of a design decision or as the result of deterioration in the earthing connection. Current passing between two separate modules at very different voltages and the vehicle bodywork can then create a release of hydrogen at dangerous levels, initiate an arc, and cause a fire.

Means appropriate for the modules according to the invention are therefore proposed to prevent such current conduction paths forming between the modules or between one or more of the modules and the vehicle bodywork.

An electrically insulating support is provided to support at least part of the accumulators of a battery pack. The support is such that it breaks the continuity of the water film and causes the drop-wise removal of water, preventing a continuous conduction path from being established.

Figure 6:
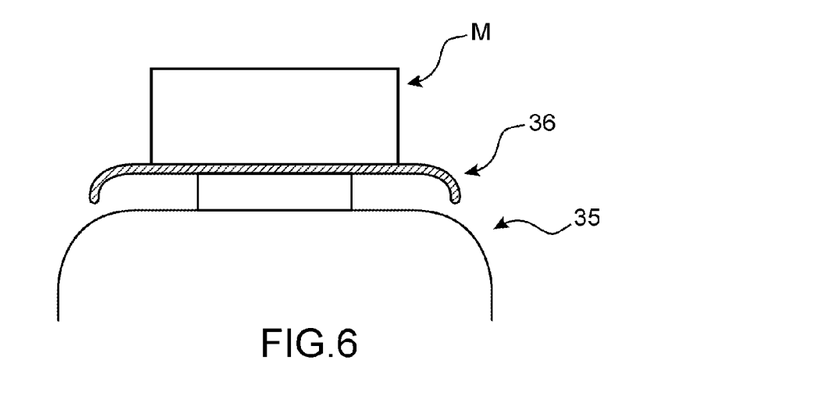
FIG. 6 is a diagrammatic representation of an example of assembly of a battery module on a vehicle.

In FIG. 6 an example of such a support can be seen. In the example this is shown fixed to the roof of an automotive vehicle 35 and supports a module M. The support 36 comprises lateral edges whose shape prevents water run-off between the modules and the vehicle bodywork and which would form a conduction path between the module and the bodywork which would be dangerous as explained above. The shape of the support 36 ensures that the flow between the upper face of the support and the lower face of the support is broken up into water drop form, and causes them to drop from the support.

In a variant one or more zones could be envisaged receding from the lower face of the insulating support, also ensuring a break in the continuity of the film or one or more receding zones and/or one or mode protruding zones.

Figure 7A:
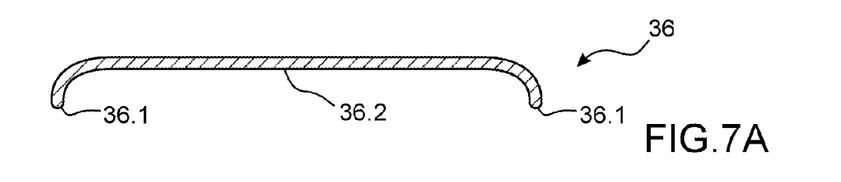
FIGS. 7A to 7C are diagrammatic representations of embodiment variations of an insulating support for a battery module which may be implemented in the assembly in FIG. 6, FIGS. 8A to 8C are diagrammatic representations of other embodiment variations of an insulating support for a battery module.

In FIG. 7A the support 36 comprises side rims 36.1 which are curved downwards such that the lower end of the rims are in a different plane to that of the lower face 36.2 of the support, causing the water flowing from the module to fall from the rim in drop form.

In all embodiment examples, the support 36 is itself supported so that the elements protruding from the lower surface are not in contact with a surface.

The rims edge the external contour of the lower face of the insulating support, to ensure that the conductive film is broken up in all directions. The representation in FIG. 7A is a transverse section view. In the case of a rectangular shaped support, four rims are envisaged, one for each side. On a disk-shaped support a circular rim is envisaged.

This support may, for example, be made from a single piece.

Figure 7B:
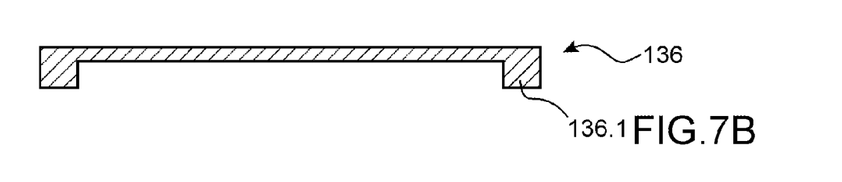

In FIG. 7B an embodiment variant of the support 136 can be seen in which the rims 136.1 are straight and are for example attached to the edges of a flat plate.

Figure 7C:
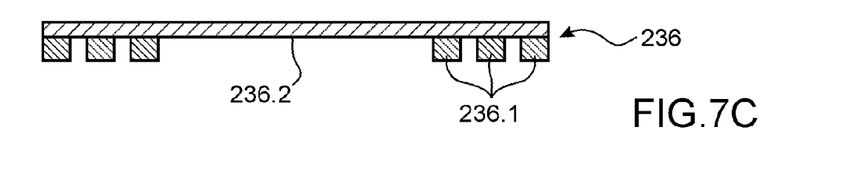

In FIG. 7C another variant of the support 236 can be seen in which the lower face 236.2 of the support comprises several protruding elements 236.1 which between them define grooves which cause drop-wise removal from the rim. A single groove can be envisaged. The use of several grooves prevents any risk of a continuous film appearing between the module and the bodywork.

Figure 9A:
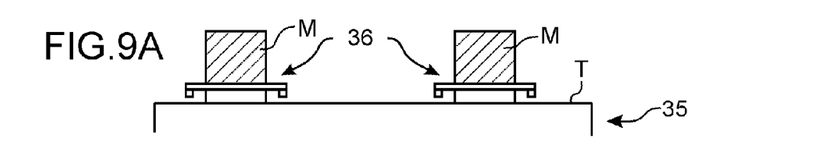
FIGS. 9A and 9B are a diagrammatic representation of an assembly of several modules.

This type of support can advantageously be used to support each module individually on the roof T of the vehicle 35 as shown in FIG. 9A.

Thus the risk of conduction between modules is avoided as are the risks of conduction between each module and the bodywork.

The assembly of the accumulators of a module with the insulating support, followed by soaking of the assembly thus formed in the resin can be envisaged.

Figure 9B:
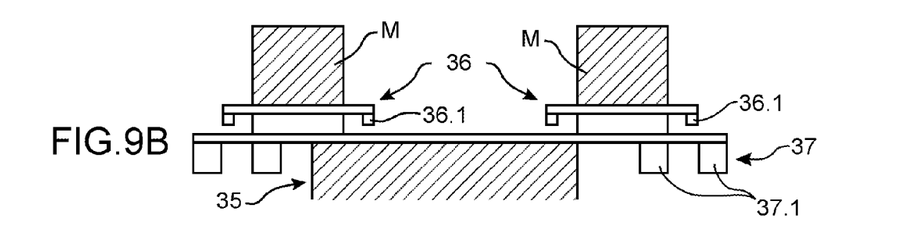

In FIG. 9B another embodiment example can be seen in which a support 36 is envisaged for each module and a common support 37 is envisaged for all supports, where the common support is such that it causes a continuous film to break up and water to be removed in a drop-wise manner. In the example shown, there is an element 37.1 protruding from the lower face 37.2 of the common support 37. Thus insulation between the modules and between the modules and the bodywork is achieved.

Figure 8A:
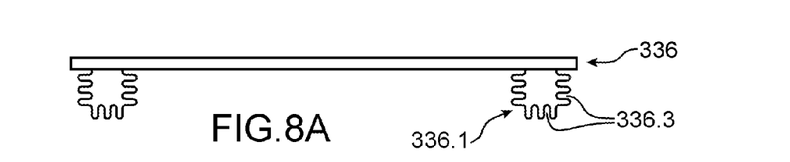
Figure 8B:
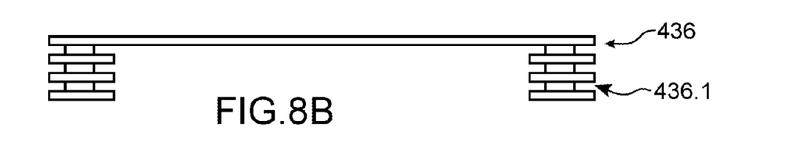
Figure 8C:
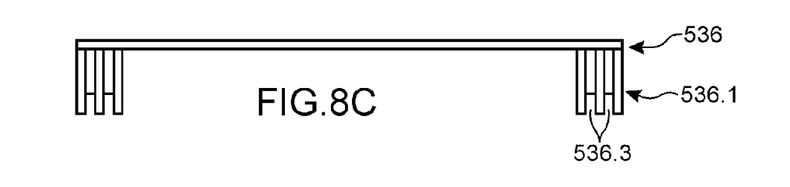

In FIGS. 8A to 8C variants of embodiments the support can be seen.

In FIG. 8A, the support 336 comprises a plate and elements 336.1 attached to its lower face and designed to break up the film of water coming from the upper side of the plate into drops and to cause them to drop. In FIG. 8A, the elements 336.1 have an elongated form. Grooves 336.3 are formed in the lateral surface of the rods Elements with one or more grooves fall within the scope of the present invention.

In FIG. 8B, the support 436 comprises the elements 436.1 which are elongated in form and which have a rectangular cross-section, fixed to the lower face of the plate by one of the faces. Grooves 436.3 are made in both faces perpendicular to that fixed to the plate. Elements whereof only one of the faces, advantageously that aligned towards the exterior, is equipped with grooves still fall within the scope of the present invention.

For example, the elements 436.1 are made by stacking and bonding strips which have different sizes, for example the strips are made of epoxy glass and they are bonded with epoxy glue. The support 46 can also be made of epoxy glass. This embodiment example offers the advantage that it can be made simply and cheaply, simply by bonding stacked plates of different widths.

In FIG. 8C, the support 536 comprises the elements 536.1 whose grooves 536.3 are made on the face opposite that fixed to the plate.

The elements of FIGS. 8B and 8C could be combined, by making elements with lateral grooves and grooves in the lower face.

Any form and any cross section of element which can interrupt the flow of water between the upper face and the lower face of the plate is suitable for making elements attached beneath the plate.

The support or supports can advantageously be made of glass and epoxy composite, with the glass usually being in the form of fibres, this material offering high levels of dielectric performance at low cost.

Advantageously the support or supports which comprise an external surface in addition present hydrophobic properties such that the water flows in the form of drops and not in the form of continuous streams. The support or supports may be covered by a hydrophobic coating; this could be for example a lacquer such as those used in the field of rail transportation, these being designed to provide very high levels of protection against the environment, high levels of electrical insulation, and easy removal of water.

It may be envisaged that the lacquer covering the support or supports is the same lacquer as that used to make the continuous envelope of the module or modules. It may then be envisaged that the assembly formed by the module or modules and the support can be soaked in the lacquer bath in order to form a continuous layer which covers both the module or modules and the support.

In an equally advantageous manner, the upper surface of the support offers a convex surface which facilitates the removal of water.

The plate may be curved, with the convexity aligned upwards or may comprise two pieces which are inclined downwards.

Monitoring of the quality of the insulation of the modules may advantageously be envisaged. For example, an intermediate metal part may be included and the voltage of this component monitored.

For example, it could be envisaged that each insulating support 36 rests on a metal support 38, where the metal supports 38 are mounted on an insulating support resting on the vehicle bodywork, so that the metallic supports are then electrically insulated from each other. The modules M are connected together by connections 40.

The metallic supports 38 are such that they are located at least partly vertically in line with the protruding zones or receding zones so that the water streams flowing under gravity from these zones come into contact with the metallic supports.

The battery also comprises means for monitoring the impedance between each module or any part electrically connected to a terminal of the module and its metallic support, these means comprising for example a voltmeter. In normal operation, the measured, impedance is very high; the module is electrically insulated from the metallic support.

In the case of heavy rain where the stream of water would be continuous or in the case of the formation of a stalactite which electrically links the module to the metal support and in the event of a defect in the insulation of a module, the measured impedance would fall. This fall in impedance is measured.

If anyone were to touch the metallic support, then since this is not connected to earth they could be electrocuted. By detecting this drop in impedance, means can be implemented to warn users and to isolate the defective module.

In this embodiment example, the variation in impedance between each module and its metallic support can be monitored individually and the defective module or any defective connection element electrically connected to a module terminal can be easily located, In a variant, instead of using metallic supports, it may be envisaged that the supports of each insulating support are themselves electrically insulating and that conductive metallic elements be provided, arranged only vertically in line with protruding or receding zones and that the variation in impedance between the module or modules and metallic elements be measured.

In a variant, it may be envisaged that all the metallic supports are electrically connected to each other and variation in impedance is only monitored between modules and the metallic supports. Advantageously it is possible to envisage using a single metallic support.

The potential of the metallic support may be monitored relative to the pack. For example, by measuring the potential difference of the metallic support relative to the module located at mid-voltage, insulation defects between the end modules and the support can be detected.

When a voltmeter is connected between the mid-point of the pack and the metallic support, through the high value internal resistance of the voltmeter, the potential of the support becomes that of the mid-point and the potential difference is zero. If a current path causes variation in the potential of the support, a difference will be shown on the voltmeter. This technique cannot detect a current path coming from the mid-point. The potential can be varied in order to detect a current path at the mid-point.

Other means may be used to check the insulation of the modules and which provide a more complete detection process, for example by varying the voltage connection point.

Figure 10:
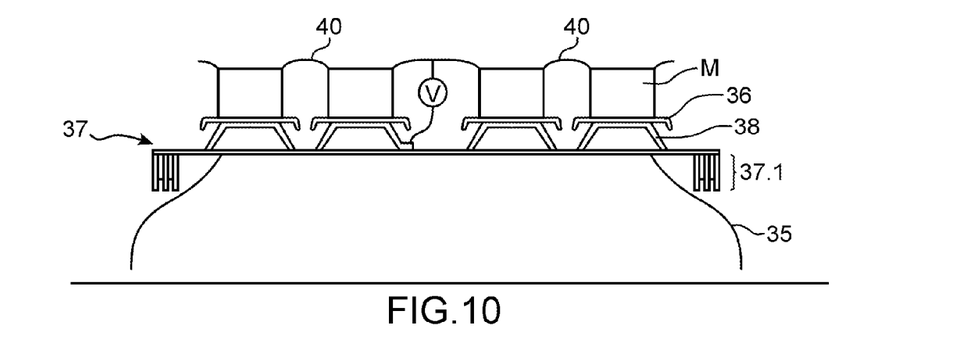
FIG. 10 is a diagrammatic representation of an assembly of several modules implementing individual supports and a collective support.

FIG. 10 shows an advantageous example which provides dual safety. Each insulating support 36 for the modules rests on a metallic support 38, where the metallic support 38 is fitted onto a common insulating support 37 which itself is resting on the vehicle bodywork. The modules M are connected together by connections 40.

The variation in impedance between the modules and the metallic support is monitored, for example using a voltmeter as described above.

The variation in impedance between the metallic support and the bodywork is also monitored, for example by using an inductometer.

If a fall in impedance is detected between the modules and the metallic support and/or between the metallic support and the bodywork, an alarm can be sent and measures taken to isolate the defective module or to ensure the safety of individuals.

It should be noted that if a fall in impedance is only detected between the modules and the metallic support, insulation is still provided by the common support and if a fall in impedance is detected between the common support and the metallic support then this is not dangerous whilst the impedance between the modules and the metallic support remains high. Furthermore, it should be noted that the metallic support or supports are not designed to be handled during normal use of the vehicle fitted with this battery.

The invention claimed is:

1. A module for an electrochemical battery comprising:
   plural accumulators distributed into several layers, and arranged in relation to each other to create at least one passage between the accumulators;
   at least one connection element to electrically connect the plural accumulators together;
   an electrical connection of the module with an exterior; and
   a continuous envelope made from a dielectric polymer material by soaking, and that covers an exterior surface of the plural accumulators and the at least one connection element and that does not cover the electrical connection of the module with the exterior, the continuous envelope covering a surface of the at least one passage.

2. A module according to claim 1, wherein a thickness of the continuous envelope is between 10 μm and 300 μm.

3. A module according to claim 1, wherein the continuous envelope is formed of plural layers made successively, wherein the layers are made from a same polymer material or from different polymer materials.

4. A module according to claim 1, wherein the polymer material is, or polymer materials are, chosen from acrylic, silicone, or phenolic lacquers.

5. A module according to claim 1, wherein the accumulators are cylindrical in shape with a circular cross-section, with the accumulators being arranged in a staggered rows.

6. A module according to claim 5, further comprising spacers placed in between the accumulators.

7. A module according to claim 1, wherein each accumulator comprises a safety device against excess pressure, the safety device being at least a relief valve.

8. A module according to claim 7, wherein the safety device against excess pressure is covered by a cap configured to be ejected in event of excess pressure.

9. A module according to claim 8, wherein the cap comprises an excess pressure vent.

10. A module according to claim 8, wherein the cap is covered by the polymer material of the continuous envelope.

11. A module according to claim 7, further comprising a filler material provided in the excess pressure safety device that prevents the polymer material from adversely affecting operation of the excess pressure safety device.

12. A module according to claim 1, wherein at least one part of the surface of the at least one passage is configured to cause turbulent flow.

13. A module according to claim 1, wherein at least one of the plural accumulators includes an envelope made of porous material, configured to be impregnated with the polymer material.

14. A module according to claim 1, further comprising electronics configured to measure, balance and control to which accumulator it is connected by an electrical connection, where the electronics and the electrical connection are covered by the envelope of polymer material.

15. A battery comprising at least one module according to claim 1.

16. A battery according to claim 15, further comprising a device to generate a movement of air between the accumulators.

17. A battery according to claim 15, further comprising:
at least one electrically insulating support on which the at least one module is arranged, the electrically insulating support comprising an upper face on which at least a part of the plural accumulators rest and a lower face, and
at least one protruding or receding zone of the lower face formed in or on the lower face, the protruding or receding zone edging all or part of an external contour of the lower face and a support element upon which the electrically insulating support rests, such that the protruding or receding zone is arranged at a distance from a surface on which the support element rests to cause a potential stream of liquid to flow under gravity.

18. A battery according to claim 17, wherein the surface comprises at least one conductive metallic element located at least vertically in line with the protruding or receding zone and means for verifying electrical insulation between the metallic conductive element and the module or any conductive part connected to a terminal of the module.

19. An automotive vehicle comprising at least one battery according to claim 15.

20. A method for manufacturing an electrolytic battery module, comprising plural accumulators, the method comprising:
distributing the plural accumulators into plural layers so that one or more passages are made between the accumulators;
electrically connecting the accumulators to each other through connecting elements and creating a connection from the module to an exterior;
protecting the connection from the module to the exterior;
creating a continuous envelope by soaking the accumulators in a bath of dielectric polymer material, wherein the continuous envelope covers a surface of the accumulators marking out a boundary of the passages between the accumulators; and
drying the polymer material.

21. A manufacturing method according to claim 20, wherein a vacuum is created during the creating of the continuous envelope.

22. A manufacturing method according to claim 20, wherein the accumulators are joined together before the creating of the continuous envelope, by bonding.

23. A manufacturing method according to claim 20, wherein the creating of the continuous envelope is carried out plural times, wherein the polymer material is a same polymer material in in the creating of the continuous envelope or not.

24. A manufacturing method according to claim 20, wherein at least one accumulator comprises a safety device against excess pressure, wherein, prior to the creating of the continuous envelope, the safety device is protected to prevent the protection device being clogged by the dielectric polymer material.

25. A manufacturing method according to claim 24, wherein the protection is provided by a cap.

* * * * *